US009609641B2

(12) United States Patent
Kakishima et al.

(10) Patent No.: US 9,609,641 B2
(45) Date of Patent: Mar. 28, 2017

(54) RADIO COMMUNICATION METHOD, RADIO COMMUNICATION SYSTEM, RADIO BASE STATION AND USER TERMINAL

(71) Applicant: NTT DOCOMO, INC., Tokyo (JP)

(72) Inventors: Yuichi Kakishima, Tokyo (JP); Satoshi Nagata, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/439,427

(22) PCT Filed: Oct. 4, 2013

(86) PCT No.: PCT/JP2013/077123
§ 371 (c)(1),
(2) Date: Apr. 29, 2015

(87) PCT Pub. No.: WO2014/069163
PCT Pub. Date: May 8, 2014

(65) Prior Publication Data
US 2015/0282133 A1    Oct. 1, 2015

(30) Foreign Application Priority Data

Nov. 2, 2012  (JP) .................................. 2012-242896

(51) Int. Cl.
*H04L 5/00*   (2006.01)
*H04W 72/04*   (2009.01)
(Continued)

(52) U.S. Cl.
CPC ........... *H04W 72/042* (2013.01); *H04J 11/00* (2013.01); *H04L 5/005* (2013.01); *H04L 5/0035* (2013.01);
(Continued)

(58) Field of Classification Search
CPC ....................................................... H04L 5/048
See application file for complete search history.

(56) References Cited

U.S. PATENT DOCUMENTS

| 2013/0279437 | A1* | 10/2013 | Ng | ......................... | H04W 48/16 |
| | | | | | 370/329 |
| 2016/0088596 | A1* | 3/2016 | Frenne | .................. | H04L 5/0035 |
| | | | | | 370/336 |

FOREIGN PATENT DOCUMENTS

| AU | 2013250063 A1 | 8/2014 |
| EP | 2654333 A1 | 10/2013 |

OTHER PUBLICATIONS

International Search Report issued in PCT/JP2013/077123 mailed on Nov. 12, 2013 (1 page).
(Continued)

*Primary Examiner* — Huy D Vu
*Assistant Examiner* — Teisha D Hall
(74) *Attorney, Agent, or Firm* — Osha Liang LLP

(57) ABSTRACT

In order to minimize deterioration in the reception accuracy even when downlink signals are transmitted from transmission points to a user terminal, a radio communication method for multiple radio base stations and a user terminal capable of communicating with the radio base stations is provided. The method involves transmitting downlink control information, a UE-specific reference signal and a channel state measurement reference signal to the user terminal, transmitting information about configuration of the channel state measurement reference signal, transmitting association information in which the configuration of the channel state measurement reference signal is associated with an information element contained in the downlink control information, determining a channel state measurement reference signal that is associated with a received UE-specific reference signal based on the association information, and per-
(Continued)

forming reception processing, assuming that the UE-specific reference signal and the channel state measurement reference signal are transmitted from a same radio base station.

10 Claims, 10 Drawing Sheets

(51) Int. Cl.
    *H04J 11/00*     (2006.01)
    *H04W 16/28*     (2009.01)
    *H04W 24/00*     (2009.01)
    *H04W 48/00*     (2009.01)
    *H04L 27/26*     (2006.01)

(52) U.S. Cl.
    CPC .......... *H04L 5/0048* (2013.01); *H04L 5/0051* (2013.01); *H04L 27/2613* (2013.01); *H04W 16/28* (2013.01); *H04W 24/00* (2013.01); *H04W 48/00* (2013.01); *H04L 5/0053* (2013.01); *H04L 5/0073* (2013.01); *H04L 5/0091* (2013.01)

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Extended Search Report issued in corresponding European Application No. 13850301.6, mailed May 11, 2016 (10 pages).

Ericsson et al.; "Discussion on Antenna Ports Co-location"; 3GPP TSG RAN WG1 Meeting #68bis, R1-121026; Jeju, Korea; Mar. 26-30, 2012 (4 pages).

Renesas Mobile Europe Ltd; "Details of CRS rate matching and quasi-colocation signaling"; 3GPP TSG-RAN WG1 Meeting #70bis, R1-124392; San Diego, USA; Oct. 8-12, 2012 (3 pages).

Samsung; "Remaining issues on quasi co-location of antenna ports"; 3GPP TSG-RAN WG1 meeting #70, R1-123493; Qingdao, P. R. China; Aug. 13-17, 2012 (7 pages).

Renesas Mobile Europe Ltd.; "Transmission mode and DCI content for Release 11"; 3GPP TSG-RAN WG1 Meeting #69, R1-122357; Prague, Czech Republic; May 21-25, 2012 (6 pages).

Huawei et al.; "Discussion on antenna ports collocation"; 3GPP TSG RAN WG1 Meeting #70, R1-123124; Qingdao, China; Aug. 13-17, 2012 (10 pages).

New Postcom; "Discussions on quasi-co-located antenna ports"; 3GPP TSG RAN WG1 Meeting #70, R1-123440; Qingdao, China; Aug. 13-17, 2012 (3 pages).

Examination Report No. 1 issued in the counterpart Australian Patent Application No. 2013339917, mailed Jan. 11, 2017 (5 pages).

\* cited by examiner

| INFORMATION ELEMENT | THE NUMBER OF BITS | DESCRIPTION |
|---|---|---|
| RESOURCE ALLOCATION HEADER | 1 | HEADER INDICATING WHICH TO USE BETWEEN RESOURCE ALLOCATION TYPE 0 AND 1 |
| RESOURCE BLOCK ASSIGNMENT | $\lceil N_{RB}^{DL}/P \rceil$ | THE NUMBER OF ALLOCATED RBS AND ALLOCATION POSITIONS (P DENOTES RBG SIZE) |
| TPC COMMAND FOR PUCCH | 2 | TPC BIT APPLIED TO PUCCH TRANSMISSION |
| HARQ PROCESS NUMBER | 3 | HARQ PROCESS NUMBER (MAXIMUM 8 PROCESSES IN LTE) |
| SCRAMBLING IDENTITY, RANK INDICATOR, DM-RS PORT | 3 | SCID, RI, DM-RS PORT INDEX ARE JOINT-ENCODED |
| MODULATION AND CODING SCHEME | 10 | MODULATION SCHEME AND CODING RATE (TBS) |
| NEW DATA INDICATOR | 2 | FLAG INDICATING NEW TRANSMISSION OR RETRANSMISSION |
| REDUNDANCY VERSION | 4 | REDUNDANCY BIT PATTERN TO TRANSMIT |

FIG.4

RADIO COMMUNICATION METHOD, RADIO COMMUNICATION SYSTEM, RADIO BASE STATION AND USER TERMINAL

TECHNICAL FIELD

The present invention relates to a radio communication method, a radio communication system, a radio base station and a user terminal all applicable to cellular systems and the like.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing data rates, providing low delay and so on, long-term evolution (LTE) has been under study (see Non Patent Literature 1).

In a third-generation system, it is possible to achieve a transmission rate of maximum approximately 2 Mbps on the downlink by using a fixed band of approximately 5 MHz. In an LTE system, it is possible to achieve a transmission rate of about maximum 300 Mbps on the downlink and about 75 Mbps on the uplink by using a variable band which ranges from 1.4 MHz to 20 MHz. In the UMTS network, successor systems to LTE are also under study for the purposes of achieving further broadbandization and higher speed (for example, LTE advanced (LTE-A)).

In the LTE system, there is a promising technique to improve system performance even more, called "inter-cell orthogonalization". For example, in the LTE-A system, intra-cell orthogonalization is made possible by orthogonal multiple access both on the uplink and on the downlink. That is to say, on the downlink, orthogonality is established between user terminals UE (user equipment) in the frequency domain. In the meantime, between cells, like in W-CDMA, interference randomization by one-cell frequency re-use is fundamental.

Then, in 3GPP (3rd Generation Partnership Project), Coordinated Multi-Point transmission/reception (CoMP) is under study as the technique for realizing inter-cell orthogonalization. In this CoMP, a plurality of cells coordinates to perform signal processing of transmission and reception for one or a plurality of user terminals. For example, as for the downlink, study has been made of simultaneous transmission from a plurality of cells to which precoding is applied, and coordinated scheduling/beamforming. By application of these CoMP techniques, improvement is expected of throughput performance particularly of a user terminal UE at a cell edge.

CITATION LIST

Non-Patent Literature

Non-Patent Literature 1: 3GPP, TR 25.912 (V7.1.0), "Feasibility study for Evolved UTRA and UTRAN", September 2006

SUMMARY OF THE INVENTION

Technical Problem

Prior to LTE Rel.10, when performing reception processing, a user terminal had only to assume that downlink signals are transmitted from a single radio base station. However, in LTE Rel.11 or later, in association with introduction of the above-mentioned CoMP techniques and the like, downlink signals may be transmitted from a plurality of transmission points.

When downlink signals are transmitted from a plurality of transmission points (radio base stations) to a user terminal, characteristics (reception signal level, reception timing, frequency offset, etc.) of the downlink signals transmitted from the respective transmission points are sometimes different depending on the positional relationship between the user terminal and each transmission point. In this situation, if the user terminal assumes that downlink signals are transmitted from a single radio base station to perform reception processing such as channel estimation, like in the conventional case, there may arise a problem of insufficient reception accuracy.

The present invention has been made in view of the foregoing and aims to provide a radio communication method, a radio communication system, a radio base station and a user terminal capable of minimizing deterioration of reception quality even when the user terminal receives downlink signals from a plurality of transmission points.

Solution to Problem

The present invention provides a radio communication method for a plurality of radio base stations and a user terminal capable of communicating with the plurality of radio base stations, the radio communication method comprising the steps of: by the radio base station, transmitting downlink control information, a UE-specific reference signal and a channel state measurement reference signal to the user terminal; transmitting information about configuration of the channel state measurement reference signal; transmitting association information in which the configuration of the channel state measurement reference signal is associated with an information element contained in the downlink control information; and by the user terminal, determining a channel state measurement reference signal that is associated with a received UE-specific reference signal based on the association information; and performing reception processing, assuming that the UE-specific reference signal and the channel state measurement reference signal are transmitted from a same radio base station.

Technical Advantage of the Invention

According to the present invention, it is possible to minimize deterioration of reception accuracy when a user terminal receives downlink signals from a plurality of transmission points.

BRIEF DESCRIPTION OF THE DRAWINGS

FIG. 4 is a diagram illustrating an example of information elements in a DCI format;

DESCRIPTION OF EMBODIMENTS

With reference to the attached drawings, embodiments of the present invention will be described in detail below.

Figure 1A:
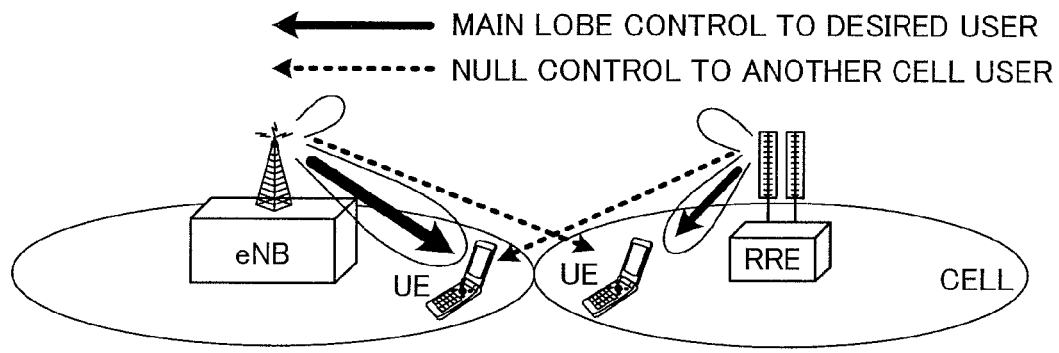
FIG. 1 provides diagrams each for explaining Coordinated Multi-Point transmission.
Figure 1B:
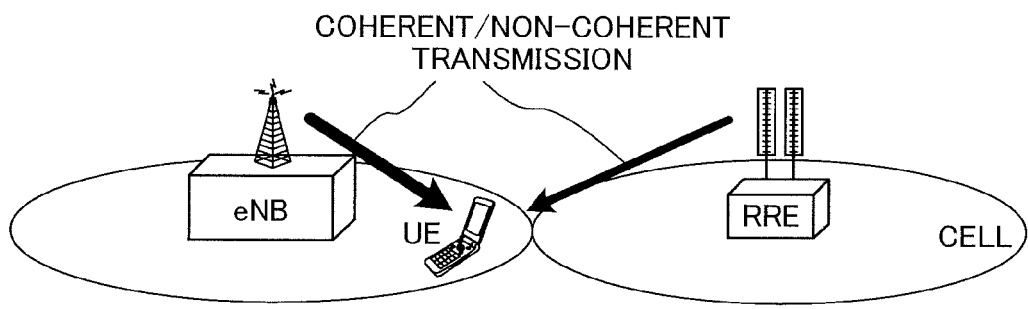
Figure 1C:
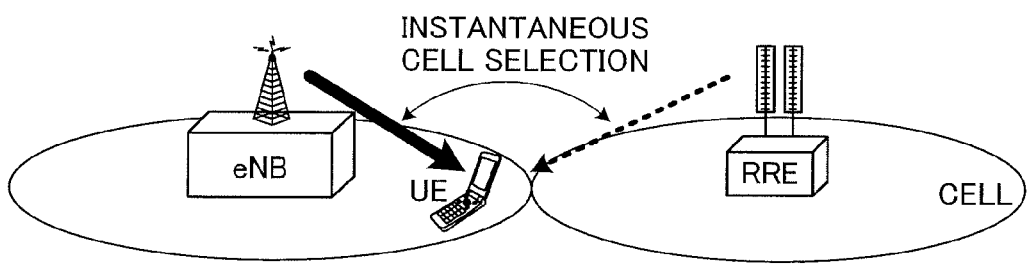

First description is made, with reference to FIG. 1, about downlink CoMP (Coordinated Multi-Point) transmission. Downlink CoMP transmission includes Coordinated Scheduling/Coordinated Beamforming (CS/CB) and Joint processing. Coordinated Scheduling/Coordinated Beamforming is a method of transmitting a shared data channel only from one transmission/reception point (or radio base station, cell) to a user terminal UE, in which method, as illustrated in FIG. 1A, allocation of radio resources in frequency/space domains is performed in consideration of interference from other transmission/reception points and interference to other transmission/reception points. On the other hand, Joint processing is a method of transmitting shared data channels simultaneously from a plurality of transmission/reception points, using precoding. Joint processing includes Joint Transmission (JT) which is a method of transmitting shared data channels from a plurality of transmission/reception points to one user terminal UE as illustrated in FIG. 1B and Dynamic Point Selection (DPS) which is a method of selecting one from a plurality of transmission/reception points instantaneously to transmit a shared data channel as illustrated in FIG. 1C. It also includes Dynamic Point Blanking (DPB) in which method, data transmission to an interfering transmission/reception point is stopped in given areas.

CoMP transmission is applied to improve throughputs of a user terminal located at a cell edge. Therefore, CoMP transmission is controlled to be applied when a user terminal is located at a cell edge. In this case, a radio base station obtains a difference of quality information per cell from the user terminal such as RSRP (Reference signal Received Power), RSRQ (Reference signal Received Quality), SINR (Signal Interference plus Noise Ratio) or the like, and when the quality difference between cells is a threshold or less, the radio base station determines that the user terminal is located at the cell edge and applies CoMP transmission.

Figure 2A:
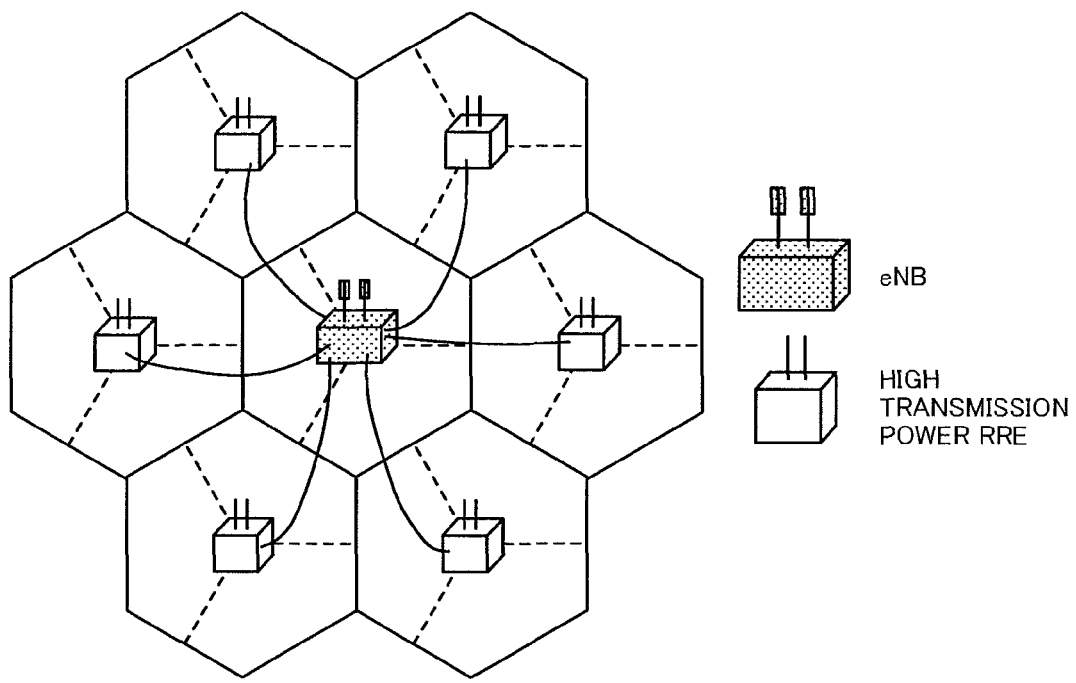
FIG. 2 provides diagrams each for explaining Coordinated Multi-Point transmission.

As an environment to which CoMP transmission/reception applies, for example, there is a configuration including a plurality of remote radio apparatuses (RRE: Remote Radio Equipment) connected to a radio base station (eNB) by optical fibers or the like (centralized control based on RRE configuration) and a configuration of a radio base station (eNB) (autonomous distributed control based on an independent base station configuration). In the RRE configuration, as illustrated in FIG. 2A, the remote radio apparatuses RRE are controlled in a centralized manner by the radio base station eNB. In the RRE configuration, as the radio base station eNB (centralized base station) that performs baseband signal processing and control of the plural remote radio apparatuses RRE and each of the cells (that is, respective remote radio apparatuses RRE) are connected to each other by baseband signals using optical fibers, it is possible to perform batch control of radio resources between the cells by the centralized base station. Therefore, in the RRE configuration, on the downlink, a method using high-speed signal processing between cells is applied like multiple-cell simultaneous transmission. In FIG. 2A, transmission power of each remote radio apparatus RRE is to the same level as transmission power of the radio base station (macro base station) eNB (high transmission power RRE).

Figure 2B:
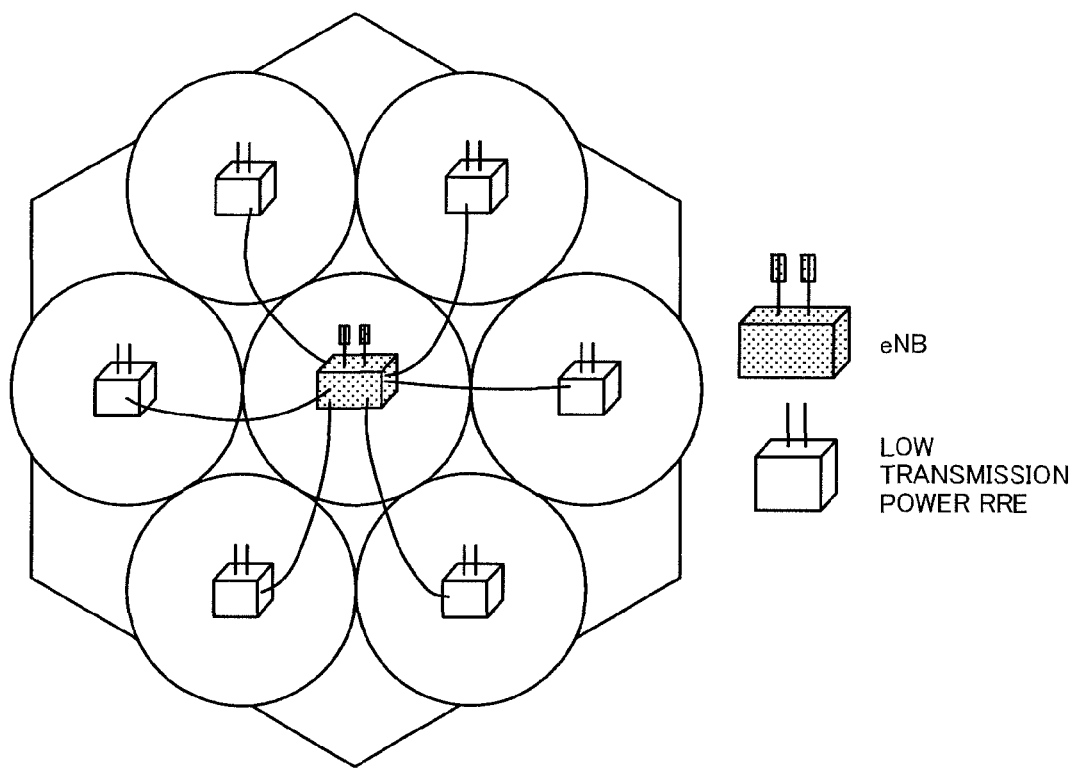

As another environment to which CoMP transmission/reception applies, there is an overlay-type network environment (heterogeneous environment) in which, as illustrated in FIG. 2B, a plurality of remote radio apparatuses RRE are arranged within a coverage of a radio base station (macro base station) eNB. In this environment, the cell of the macro base station eNB and the cells of the remote radio apparatuses RRE are different from each other, that is, there are an environment in which the cell identification information (cell ID) of the macro base station eNB and the cell ID of the remote radio apparatus RRE are different (first heterogeneous environment) and an environment in which the cell of the macro base station eNB and the cell of the remote radio apparatus RRE are the same, that is, the cell ID of the macro base station eNB and the cell ID of the remote rate apparatus RRE are the same (second heterogeneous environment). In FIG. 2B, transmission power of the remote radio apparatus RRE is lower than the transmission power of the radio base station (macro base station) (low transmission power RRE).

As described above, when CoMP technique is applied, downlink signals (downlink control signals, downlink data signals, synchronization signals, reference signals and the like) are transmitted from a plurality of transmission points to a user terminal. The user terminal performs reception processing based on reference signals contained in downlink signals (e.g., Cell specific Reference Signals (CRS), UE specific DeModulation Reference Signals (DM-RS), channel state measurement reference signal (CSI-RS: channel state information-reference signals), etc.). The reception processing performed by the user terminal is signal processing including, for example, channel estimation, synchronization processing, demodulation processing, feedback information (CSI) generation processing and so on.

Figure 3A:
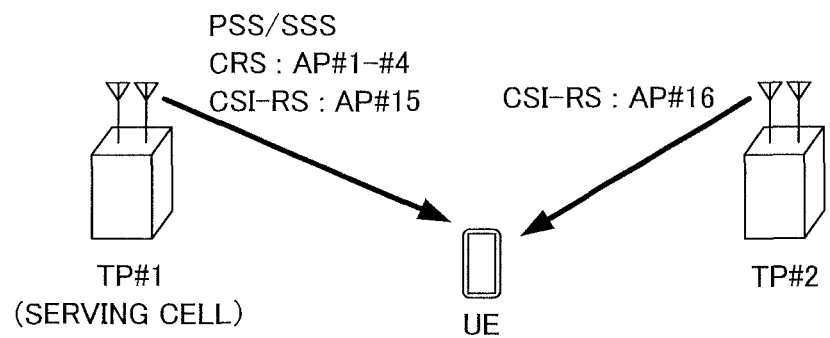
FIG. 3 provides diagrams for explaining reception power of downlink signals transmitted from respective transmission points in Coordinated Multi-Point transmission.
Figure 3B:
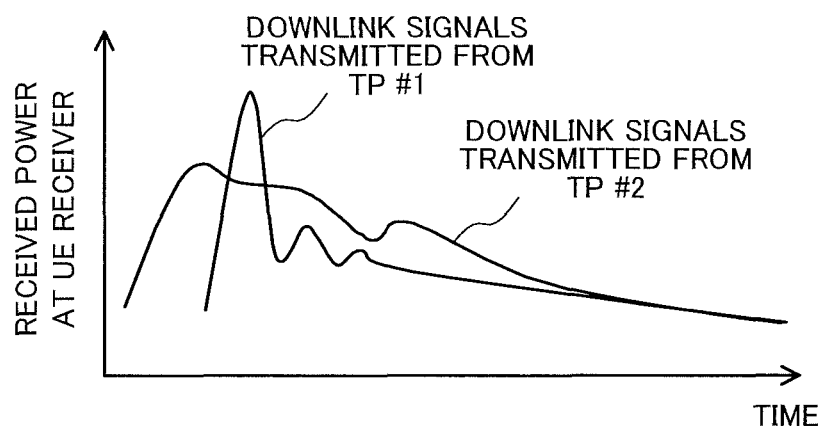

However, when downlink signals are transmitted to the user terminal from geographically different multiple transmission points, the downlink signals are sometimes different in reception signal level, reception timing or the like at the user terminal (see FIGS. 3A and 3B). The user terminal does not understand from which transmission point, each received downlink signal (for example, reference signals allocated to different antenna ports (AP)) is transmitted. Then, when the user terminal performs channel estimation, demodulation processing and the like using all received reference signals, the reception accuracy may be deteriorated problematically.

Therefore, when performing reception processing using the reference signals transmitted from the respective transmission points, it is preferable that the user terminal performs the reception processing in consideration of geographical locations of the respective transmission points (propagation characteristics of the downlink signals transmitted from the respective transmission points). Then, it is considered that assuming "Quasi co-location" in which large-scale propagation properties are the same between different antenna ports (APs), the user terminal performs reception processing depending on whether downlink signals are of "Quasi co-location" or not.

The large-scale propagation properties mean delay spread, Doppler spread, frequency shift, average received power, reception timing and the like, and when some or all of these large-scale propagation properties are the same between transmission points, they are assumed to be of quasi co-location. Quasi co-location applies to transmission points of geographically same location, however, the transmission points do not necessarily have to be located close to each other.

For example, transmission is performs APs geographically distant from each other (not of quasi co-location), the user terminal is able to perform different reception processing from that performed for quasi co-location, upon recognizing that transmission is performed geographically distant APs. Specifically, the user terminal performs the reception processing (for example, signal processing such as channel measurement (estimation), synchronization processing, demodulation processing, feedback information (CSI) generation processing) independently for each of the APs that are geographically distant from each other.

As one example, it is assumed that CRSs are transmitted from APs that are determined to be geographically co-located (in quasi co-location) and CSI-RSs are transmitted from AP #15 and AP #16 that are determined to be geographically distant from each other (not in quasi co-location). In this case, the user terminal performs the reception processing (measurement) using the CRSs like in the conventional case. As for the CSI-RSs, the user terminal performs channel estimation independently for AP #15 and AP #16 and then, generates channel quality information and feeds them back.

In the user terminal, objects for determining whether or not different APs are in quasi co-location include, for example, PSS/SSS, CRS, DM-RS (for PDSCH), DM-RS (for ePDCCH), CSI-RS and the like.

In this way, in Rel. 11 and later, it is important to perform the reception processing in consideration of relationship between downlink signals (whether or not the downlink signals are in quasi co-location). The present inventors have noted, as the relationship between downlink signals, relationship between UE-specific demodulation reference signals (DM-RSs) and channel state measurement reference signals (CSI-RSs). As the DM-RSs are basically mapped to a region where PDSCH is mapped (for example, resource blocks), if the mapping density is low, there may arise a problem of poor channel estimation accuracy. In addition, for example, when DPS is applied in CoMP, the user terminal may not be able to accurately recognize from which transmission point a DM-RS received by the user terminal is transmitted.

Therefore, the user terminal determines a CSI-RS that is associated with the received DM-RS (CSI-RS that is in quasi co-location with the DM-RS) and performs the reception processing using the DM-RS and CSI-RS that are in quasi co-location, effectively. For example, regarding the demodulation processing using a DM-RS, reception timing of a CSI-RS in quasi co-location with the DM-RS and power delay profile (PDP) may apply.

Then, the present inventors have found that in order for the user terminal to determine a CSI-RS that is in association with a DM-RS, the number of a CSI-RS configuration is associated with an information element contained in downlink control information (information element in a DCI format) and this association information is given to the user terminal. With this structure, the user terminal determines, based on the received association information, that the received DM-RS and a given CSI-RS are in quasi co-location thereby to be able to perform the reception processing (for example, channel measurement of the DM-RS using the reception timing of the CSI-RS).

Next, with reference to the accompanying drawings, the present embodiment will be described in detail below. In the following description, a DM-RS for an existing PDSCH is taken as an example of DM-RS, however, this is not intended for limiting the present invention. The present invention is able to be applied to a DM-RS for a newly defined enhanced PDCCH (ePDCCH) appropriately. Here, the enhanced PDCCH denotes a control region that is time-division-multiplexed with a PDSCH in the data region of an existing system (LTE Rel. 10), and it is able to be subjected to demodulation processing based on the DM-RS like data signals (PDSCH signals).

In the present embodiment, a radio base station notifies a user terminal of signaling (association information) for associating a CSI-RS configuration with an information element contained in downlink control information. The information element contained in the downlink control information denotes an information element defined in the DCI format, and includes, for example, "Resource allocation header", "Resource block assignment", "TPC command for PUCCH", "HARQ process number", "Scrambling identity", "rank indicator", "DM-RS port", "Modulation and coding scheme", "New data indicator", "Redundancy version" and the like that are defined in the DCI format 2C (see FIG. 4).

Here, DCI formats and information elements available in the present embodiment are not limited to those described above. Information elements in other DCI formats (for example, DCI format 2B) and newly defined DCI formats (for example, DCI format 2D) may be used. For example, a method (explicit) may be used in which in a newly defined DCI format, correspondence between a CSI-RS and a DM-RS (correspondence between a CSI-RS configuration and an information element) is defined explicitly as bit information and sent to a user terminal.

Figure 5A:
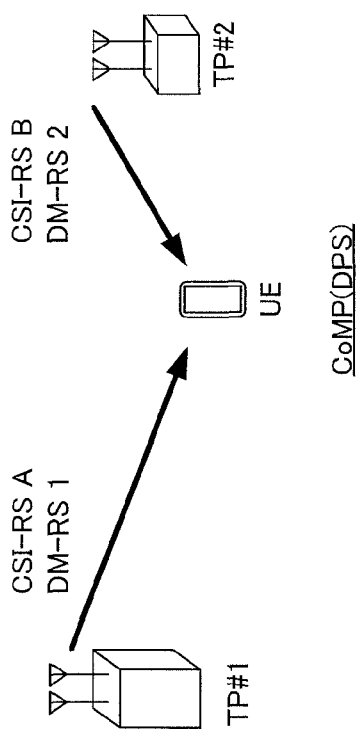
FIG. 5 provides diagrams illustrating an example of assignment pattern of downlink signals transmitted from a plurality of transmission points.
Figure 5B:
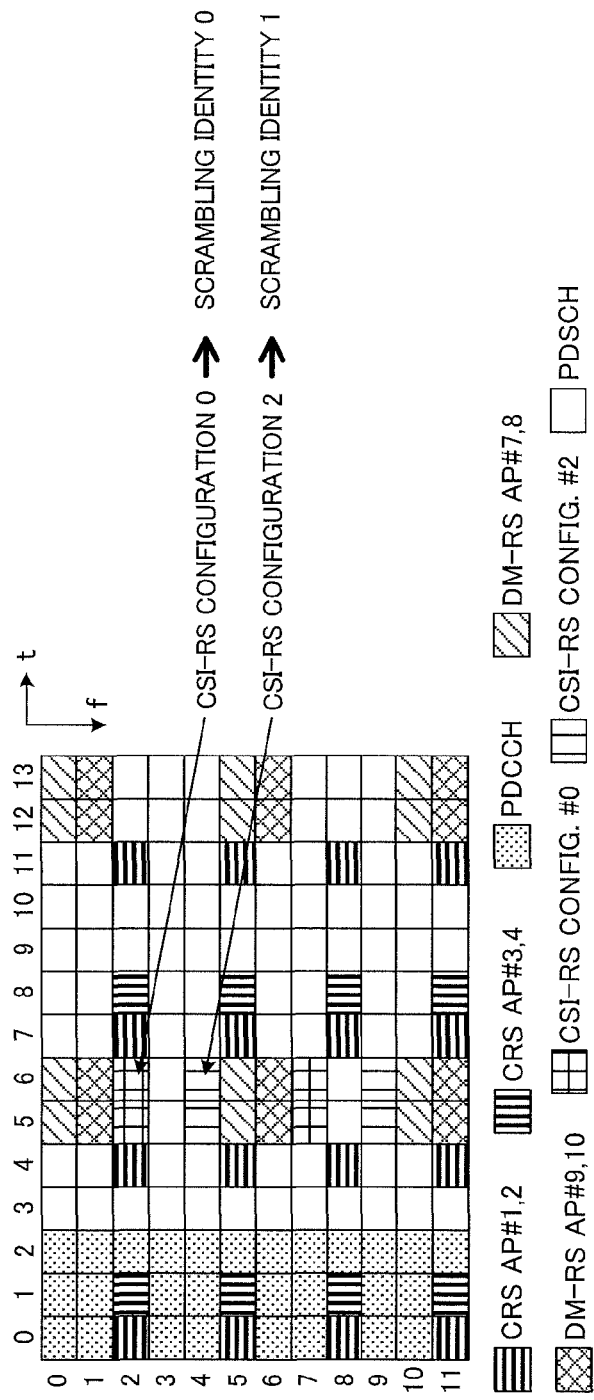

With reference to FIGS. 5A and 5B, description is made below, as one example, about the case in which the number of a CSI-RS configuration is associated with "Scrambling identity" that is one of information elements in the DCI format. Needless to say, in the present invention, an information element to apply is not limited to "Scrambling identity".

In FIG. 5A, it is assumed that CoMP (DPS) is performed using two transmission points (TP #1, TP #2) and CSI-RS A and DM-RS 1 are transmitted from TP #1 and CSI-RS B and DM-RS 2 are transmitted from TP #2. Each transmission point notifies the user terminal of downlink control information (DCI), user data, reference signals (CRS, CSI-RS, DM-RS, etc.) as well as information about the CSI-RS configuration indicating a CSI-RS mapping position by higher layer signaling.

In FIG. 5, the user terminal is notified of the numbers 0 and 2 of the CSI-RS configuration (for example, TP #1 corresponds to the CSI-RS configuration 0 and TP #2 corresponds to the CSI-RS configuration 2).

In addition, in the present embodiment, the radio base station (transmission point) notifies the user terminal of information (association information) for associating the number of the CSI-RS configuration and Scrambling identity, in addition to the above-mentioned signals. For example, the user terminal is notified that "the CSI-RS configuration 0" corresponds to "Scrambling identity 0" and "the CSI-RS configuration 2" corresponds to "Scrambling identify 1".

Scrambling identity is used in determining an initial value $C_{init}$ when generating a pseudo random sequence, and may be represented as "0" or "1". For example, it may be configured that Scrambling identity 0 is applied to scrambling at the transmission point #1 and Scrambling identity 1 is applied to scrambling at the transmission point #2.

The association information of which the radio base station notifies the user terminal may be signaled by higher layer signaling (for example, RRC signaling or broadcasting) semi-statically. In addition, it may be signaled dynamically using a control channel (PDCCH, ePDCCH). Further, the association information may be signaled from each transmission point or may be signaled together from a predetermined transmission point.

The user terminal specifies "Scrambling identity" contained in received downlink control information (DCI) and determines (specifies) a CSI-RS in association with the received DM-RS (CSI-RS in quasi co-location with DM-RS) based on association information signaled in advance from the radio base station.

For example, when "Scrambling identity" contained in downlink control information (DCI) received by the user terminal is "0," the user terminal determines that the received DM-RS is in quasi co-location with the CSI-RS configuration 0. Then, the user terminal is able to perform channel measurement of the DM-RS and the like based on the reception timing of the CSI-RS configuration 0. On the other hand, when "Scrambling identity" contained in downlink control information (DCI) received by the user terminal is "1," the user terminal determines that the received DM-RS is in quasi co-location with the CSI-RS configuration 2 and performs the reception processing.

Thus, in the present embodiment, the user terminal receives, in advance, information for associating a predetermined CSI-RS configuration with a predetermined information element in the DCI format (for example, Scrambling identity), determines a CSI-RS that is in quasi co-location with the DM-RS based on the dynamically received downlink control information (DCI) and performs the reception processing. With this structure, the user terminal is able to perform the reception processing such as demodulation processing using the DM-RS by using the reception timing of a CSI-RS that is in quasi co-location with the DM-RS and power delay profile, which makes it possible to improve the accuracy of channel measurement using DM-RS.

As for a CSI-RS which configuration is different from the CSI-RS configuration associated with the information element of the downlink control information (DCI) in the association information, the user terminal determines that the CSI-RS and the received DM-RS are not in quasi co-location and performs the reception processing.

For example, as illustrated in FIG. 5 above, it is assumed that association of the numbers of the CSI-RS configuration and scrambling identity is configured and the user terminal is notified of such association information. In this case, when "Scrambling identity 0" is contained in the received downlink control information, the user terminal determines the received DM-RS is not in quasi co-location with CSI-RSs other than the CSI-RS using the CSI-RS configuration number 0. With this structure, it is possible to prevent the reception processing from being performed using the DM-RS and CSI-RS that are not in quasi co-location.

Here, in the radio communication system, there are a case in which a CSI-RS configuration of which a user terminal is notified is reconfigured and a case in which a cell ID used in generation of a DM-RS (for example, physical cell ID (PCID), a virtual cell ID (VCID)) is reconfigured. In this case, if quasi co-location of the CSI-RS and DM-RS is determined based on association information of which the user terminal is notified, any change associated with reconfiguration is not reflected and determination may be performed in error.

In order to solve this problem, it is preferable that the radio base station (transmission point) notifies the user terminal of whether determination of quasi co-location is allowed using a CSI-RS configuration and an information element in the DCI format (for example, Scrambling identity). As a method for notifying the user terminal of whether determination of quasi co-location using the association information is allowed or not, there are a method that the radio base station notifies the user terminal explicitly (explicit) and a method that the radio base station notifies the user terminal implicitly (implicit).

For example, the radio base station may notifies the user terminal of whether determination using association information is allowed or not, in one bit, by higher layer signaling (for example, RRC signaling, broadcasting) (explicit). Or, when receiving association information, the user terminal determines whether the CSI-RS and DM-RS are in quasi co-location or not based on the association information and when the CSI-RS configuration or a cell ID (PCID/VCID) used in DM-RS generation is reconfigured, the user terminal is able to stop determination of quasi co-location based on the association information.

Thus, by notifying the user terminal of whether determination of quasi co-location using association information is allowed or not, it is possible to prevent reduction in reception quality due to reconfiguration of a CSI-RS configuration or cell ID used in DM-RS generation (PCID/VCID).

<Radio Communication System>

Figure 6:
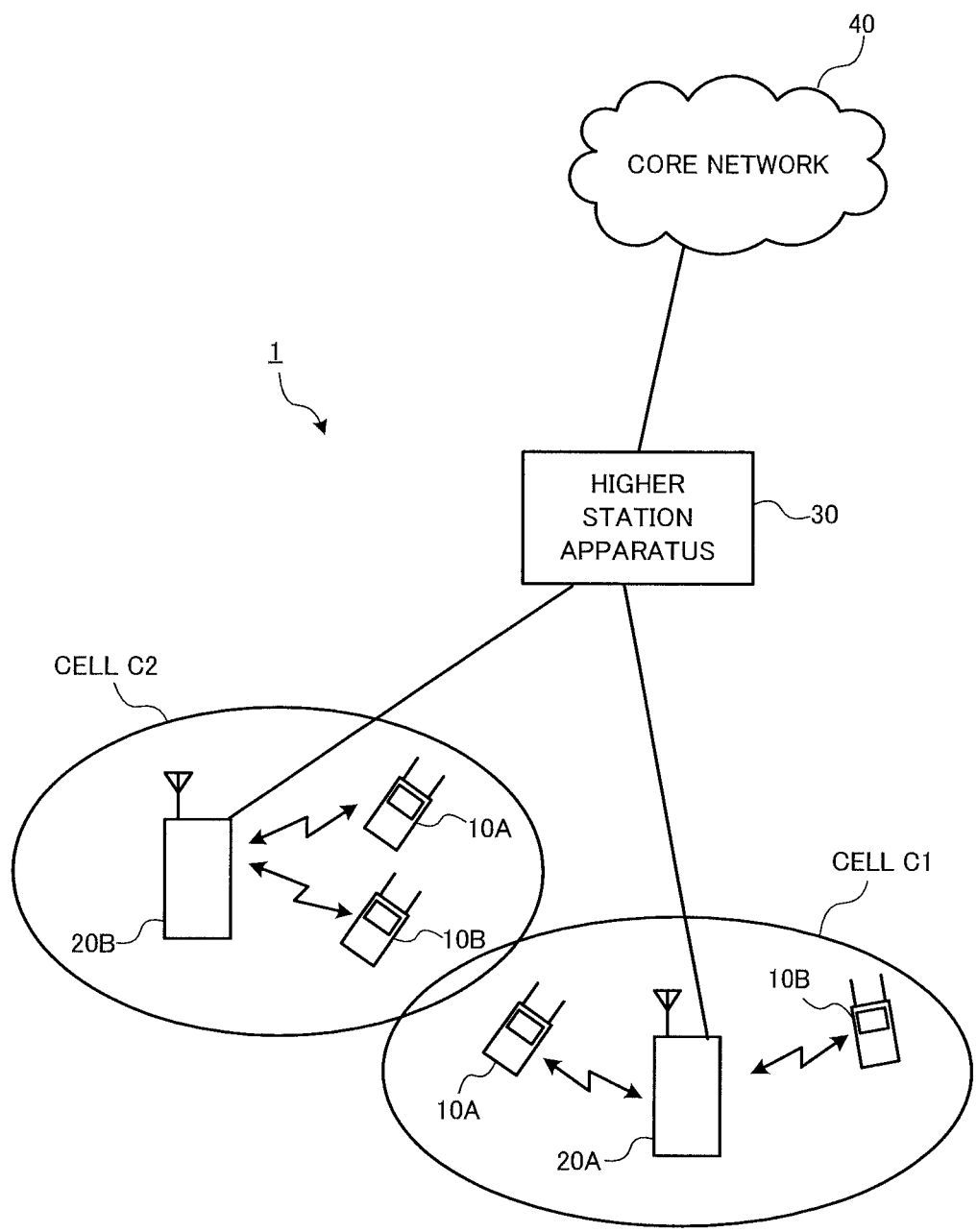
FIG. 6 is a diagram for explaining the system configuration of a radio communication system.

Next description is made in detail about a radio communication system according to the present embodiment. FIG. 6 is a diagram for explaining the system configuration of a radio communication system according to the present embodiment. This radio communication system has a plurality of radio base stations (transmission points) and a user terminal that is configured to be capable of coordinated multi-point transmission and reception with the plurality of radio base stations.

The radio communication system illustrated in FIG. 6 is, for example, the LTE system or a system including SUPER 3G. In this radio communication system, carrier aggregation is adopted such that a plurality of basic frequency blocks are aggregated, each of the basic frequency blocks being a unit of a system band of the LTE system. In addition, this radio communication system may be called IMT-Advanced or 4G.

As illustrated in FIG. 6, the radio communication system 1 is configured to include radio base stations 20A and 20B and a plurality of user terminals such as a first user terminal 10A and a second user terminal 10B, which communicate with the radio base stations 20A and 20B. Each of the radio base stations 20A and 20B is connected to a higher station apparatus 30, and the higher station apparatus 30 is connected to a core network 40. The radio base stations 20A and 20B are connected wiredly or wirelessly to each other. The first and second user terminals 10A and 10B are able to communicate with the radio base stations 20A and 20B in cells C1 and C2, respectively. The higher station apparatus 30 includes, but is not limited to, an access gateway apparatus, a radio network controller (RNC), a mobility management entity (MME) and so on. Between the cells, control of CoMP transmission is made by a plurality of base stations according to need.

Each of the first user terminal 10A and the second user terminal 10B may comprise an LTE terminal or an LTE-A terminal, however, they are described as the first and second user terminals below, except where specifically noted. In addition, for convenience of explanation, in the following description, it is the first user terminal 10A and the second user terminal 10B that perform wireless communications with the radio base stations 20A and 20B. However, more generally, the user terminals (UE) may be user terminals including a fixed or stationary terminal.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink, though the uplink radio access scheme is not limited to SC-FDMA. OFDMA is a multi-carrier transmission scheme to perform communications by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

The downlink communication channels include a PDSCH (Physical Downlink Shared Channel) which is a downlink data channel used by each of the first user terminal 10A and the second user terminal 10B on a shared basis, downlink L1/L2 control channels (PDCCH, PCFICH, PHICH), and enhanced control channel (ePDCCH). PDSCH is used to transmit transmission data and higher control information. PDCCH (Physical Downlink Control Channel) and ePDCCH (enhanced Physical Downlink Control Channel) are used to transmit scheduling information of PUSCH and PDSCH and the like. PCFICH (Physical Control Format Indicator Channel) is used to transmit OFDM symbol number used in PDCCH. PHICH (Physical Hybrid-ARQ Indicator Channel) is used to transmit ACK/NACK of HARQ of PUSCH.

The uplink communication channels include a PUSCH (Physical Uplink Shared Channel) which is an uplink data channel used by each user terminal on a shared basis, and a PUCCH (Physical Uplink Control Channel) which is an uplink control channel. This PUSCH is used to transmit transmission data and higher control information. The PUCCH is used to transmit downlink channel state information (CSI), ACK/NACK, and so on.

Figure 7:
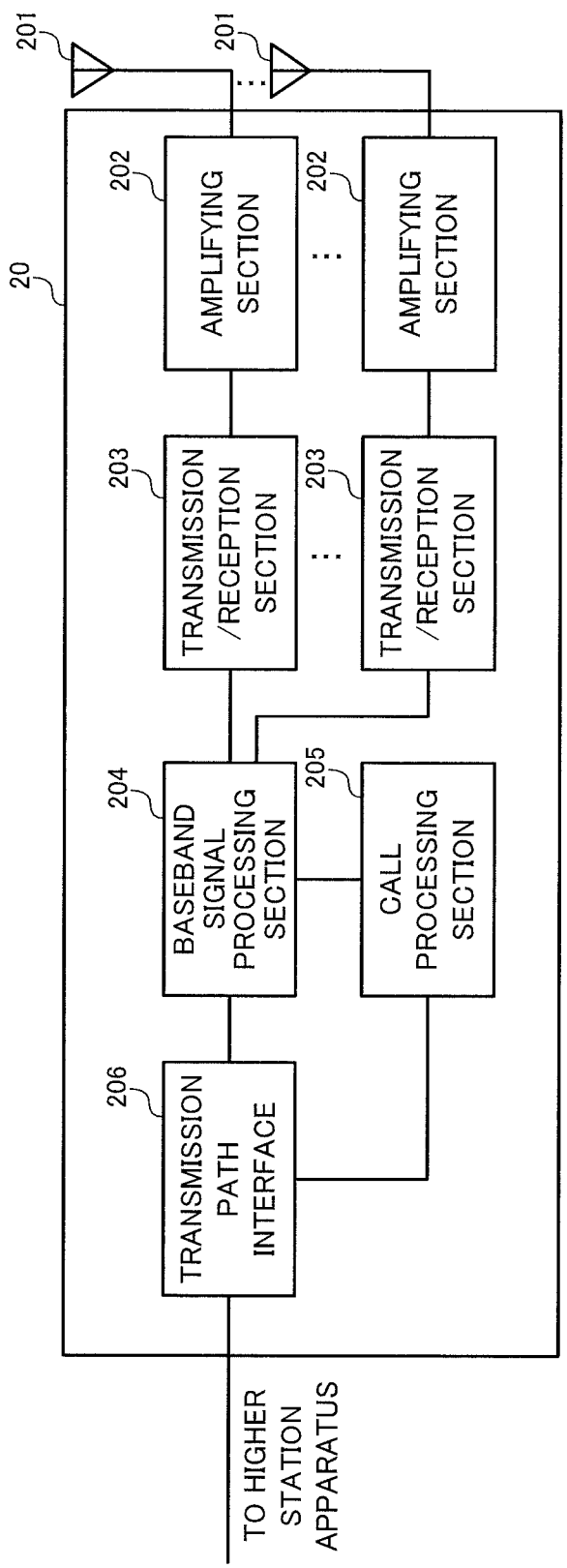
FIG. 7 is a diagram for explaining an overall configuration of a radio base station.

With reference to FIG. 7, an overall configuration of the radio base station according to the present embodiment will be described below. As the radio base stations 20A and 20B have the same structures, they are described together as a radio base station 20 below. As the first and second user terminals 10A and 10B, described later, also have the same structures, they are described as a user terminal 10 below.

The radio base station 20 has transmission/reception antennas 201, amplifying sections 202, transmission/reception sections (transmission sections/reception sections) 203, a baseband signal processing section 204, a call processing section 205 and a transmission path interface 206. Transmission data that is to be transmitted on the downlink from the radio base station 20 to the user terminal is input from the higher station apparatus 30, through the transmission path interface 206, into the baseband signal processing section 204.

In the baseband signal processing section 204, downlink data channel signals are subjected to PDCP layer processing, RLC (Radio Link Control) layer transmission processing such as division and coupling of transmission data and RLC retransmission control transmission processing, MAC (Medium Access Control) retransmission control, including, for example, HARQ transmission processing, scheduling, transport format selection, channel coding, inverse fast Fourier transform (IFFT) processing, and precoding processing. As for signals of the physical downlink control channel as the downlink control channel, transmission processing is performed, including channel coding and inverse fast Fourier transform.

The baseband signal processing section 204 notifies each user terminal 10 connected to the same cell of control information for the user terminal 10 to perform wireless communications with the radio base station 20, by a broadcast channel. Information for communication in this cell includes, for example, uplink or downlink system bandwidth, identification information of a root sequence (Root Sequence Index) for generating random access preamble singles in PRACH (Physical Random Access Channel) and so on.

In each transmission/reception section 203, baseband signals which are output from the baseband signal processing section 204 are subjected to frequency conversion processing into a radio frequency band. The amplifying section 202 amplifies the radio frequency signals having been subjected to frequency conversion, and outputs the resultant signals to the transmission/reception antenna 201. The transmission/reception section 203 serves as a transmission section for transmitting downlink control information, user data, reference signals (CRS, DM-RS, CSI-RS), information about CSI-RS configuration and association information in which the CSI-RS configuration is associated with an information element contained in the downlink control information.

Meanwhile, as for data to be transmitted on the uplink from the user terminal 10 to the radio base station 20, radio frequency signals are received in each transmission/reception antenna 201, amplified in the amplifying section 202, subjected to frequency conversion and converted into baseband signals in the transmission/reception section 203, and the resultant signals are input to the baseband signal processing section 204.

The baseband signal processing section 204 performs FFT (Fast Fourier Transform) processing, IDFT (Inverse Discrete Fourier Transform) processing, error correction decoding, MAC retransmission control reception processing, and RLC layer and PDCP layer reception processing on the transmission data included in the baseband signals received on the uplink. Then, the decoded signals are transferred to the higher station apparatus 30 through the transmission path interface 206.

The call processing section 205 performs call processing such as setting up and releasing a communication channel, manages the state of the radio base station 20 and manages the radio resources.

Figure 8:
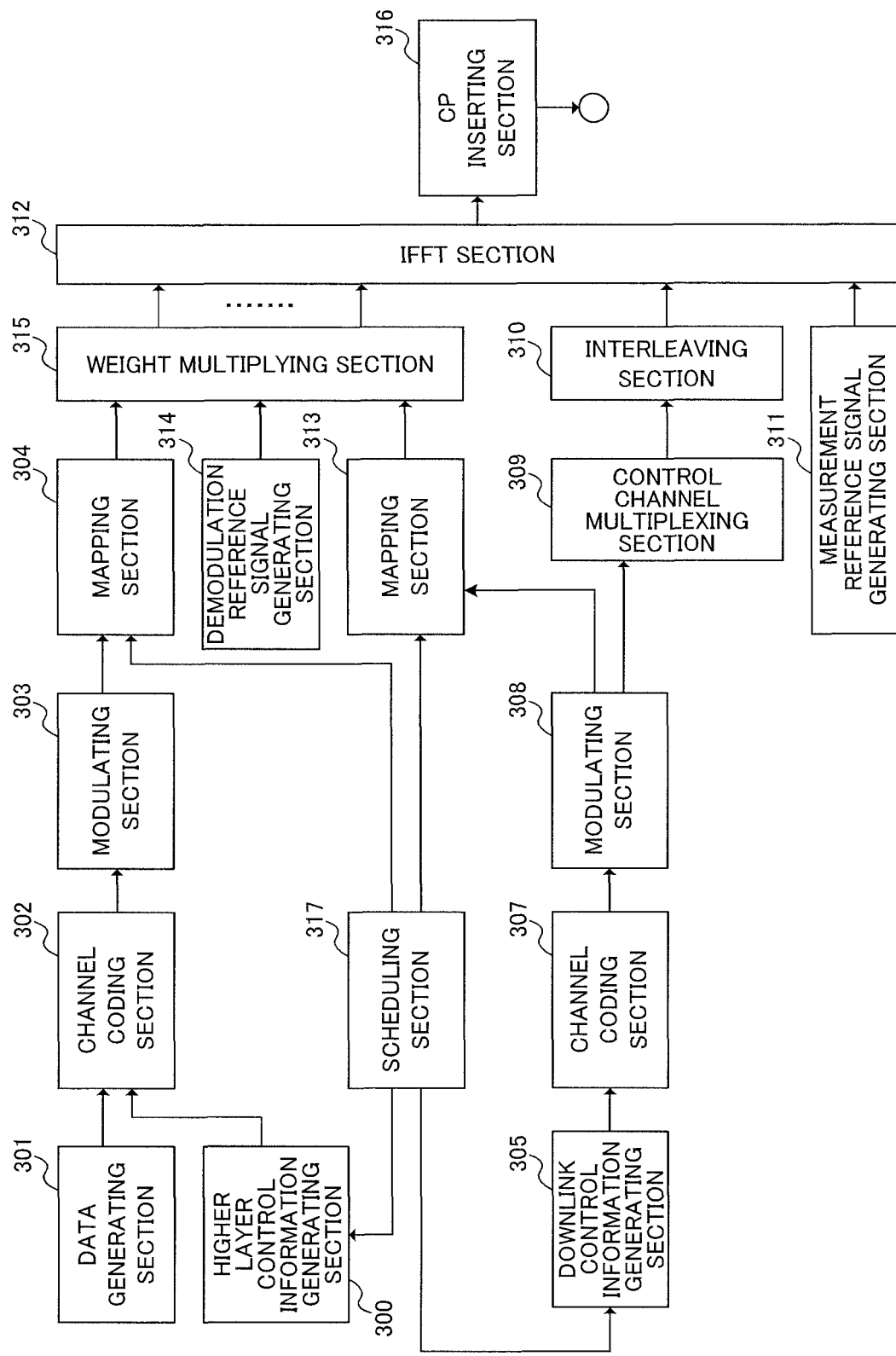
FIG. 8 is a functional block diagram of a baseband signal processing section of the radio base station.

FIG. 8 is a diagram illustrating a functional structure of the baseband signal processing section 204 of the radio base station illustrated in FIG. 7 and a part of the higher layer. The functional structure in FIG. 8 is mainly for downlink (transmission), however the radio base station 20 may also have a functional structure for uplink (reception).

As illustrated in FIG. 8, the radio base station 20 has a higher layer control information generating section 300, a data generating section 301, a channel coding section 302, a modulating section 303, a mapping section 304, a downlink control information generating section 305, a channel coding section 307, a modulating section 308, a control channel multiplexing section 309, an interleaving section 310, a measurement reference signal generating section 311, an IFFT section 312, a mapping section 313, a demodulation reference signal generating section 314, a weight multiplying section 315, a CP inserting section 316, and a scheduling section 317.

The higher layer control information generating section 300 generates higher layer control information for each user terminal 10. The higher layer control information is control information signaled by higher layer (for example, RRC signaling or broadcasting), and includes, for example, information about CSI-RS configuration. It may include association information in which the CSI-RS configuration is associated with an information element (for example, Scrambling identity) contained in downlink control information (DCI), when the association information is signaled by higher layer signaling. The data generating section 301 generates downlink user data for each user terminal 10.

Downlink user data generated in the data generating section 301 and higher layer control information generated in the higher layer control information generating section 300 are input to the channel coding section 302 as downlink data to be transmitted via PDSCH. The channel coding section 302 performs channel coding on downlink data for each user terminal 10 in accordance with a coding rate that is determined based on feedback information from the user terminal 10. The modulating section 303 modulates the channel-coded downlink data in accordance with a modulation scheme that is determined based on the feedback information from the user terminal 10. The mapping section 304 maps the modulated downlink data in accordance with instructions from the scheduling section 317.

The downlink control information generating section 305 generates downlink control information (DCI) for each user terminal 10. The downlink control information includes PDSCH assignment information (DL assignment), PUSCH assignment information (UL grant) and the like. The downlink control information generating section 305 generates downlink control information using a predetermined DCI format. For example, the downlink control information generating section 305 configures Scrambling identity of an information element in the DCI format to be a predetermined value (for example, 0).

The downlink control information generated in the downlink control information generating section 305 is input to the channel coding section 307 as downlink control information to be transmitted via PDCCH or enhanced PDCCH. The downlink control information to be transmitted in the PDCCH is able to be generated in control channel element (CCE) units and the downlink control information to be transmitted in the enhanced PDCCH is able to be generated in enhanced control channel element (eCCE) units. Here, the CCE and eCCE may be different in size (the number of REs) or may be the same.

The channel coding section 307 performs channel coding on the input downlink control information in accordance with the coding rate instructed from the scheduling section 317. The modulating section 308 modulates the channel-coded downlink control information in accordance with the modulation scheme instructed from the scheduling section 317.

Note that the downlink control information to be transmitted via PDCCH is input from the modulating section 308 to the control channel multiplexing section 309 and is then multiplexed. The downlink control information multiplexed in the control channel multiplexing section 309 is interleaved in the interleaving section 310. The interleaved downlink control information is input, together with measurement reference signals (CSI-RS, CRS, etc.) generated in the measurement reference signal generating section 311, to the IFFT section 312.

The downlink control information to be transmitted via the enhanced PDCCH is input from the modulating section 308 to the mapping section 313. The mapping section 313 maps the downlink control information in predetermined allocation units (for example, in eREG units) in accordance with instructions from the scheduling section 317.

The mapped downlink control information is input to the weight multiplying section 315, together with downlink data to be transmitted via the PDSCH (that is, downlink data mapped in the mapping section 304) and the UE-specific demodulation reference signals (DM-RS) generated in the demodulation reference signal generating section 314. The weight multiplying section 315 multiplies the downlink data to be transmitted via the PDSCH, downlink control information to be transmitted via the enhanced PDCCH and the demodulation reference signals by precoding weights specific to the user terminal 10 and performs precoding thereon.

The precoded transmission data is input to the IFFT section 312, subjected to inverse fast Fourier transform and converted from frequency domain signals to time-series signals. The signals output from the IFFT section 312 are then applied with cyclic prefix (CP) that serves as a guard interval in the CP inserting section 316 and are output to the transmission/reception section 203.

The scheduling section 317 performs scheduling of downlink data to be transmitted on the PDSCH, downlink control information to be transmitted on the enhanced PDCCH and downlink control information to be transmitted on the PDCCH. Specifically, the scheduling section 317 allocates radio resources based on the feedback information from each user terminal 10 (for example, CSI (Channel State Information) including RI (Rank Indicator), CQI (Channel Quality Indicator) and the like) and instruction information from the higher station apparatus 30.

In the present embodiment, the radio base station 20 notifies the user terminal of association information in which the CSI-RS configuration is associated with an information element (for example, Scrambling identity) contained in the downlink control information (DCI). For example, when the association information is semi-statically signaled by higher layer signaling (for example, RRC signaling or using broadcast signals), the association information may be generated in the higher layer control information generating section 300. Or, when the association information is dynamically signaled using the downlink control channel, the association information may be generated in the downlink control information generating section 305.

Next, with reference to FIG. 9, an overall configuration of the user terminal according to the present embodiment will be described below. As the LTE terminal and LTE-A terminal are the same in principal structure of hardware, they are described undiscriminatingly. The user terminal 10 has transmission/reception antennas 101, amplifying sections 102, transmission/reception sections (transmission sections/reception sections) 103, a baseband signal processing section 104 and an application section 105.

As for downlink data, radio frequency signals received in the transmission/reception antennas 101 are amplified in the respective amplifying sections 102, and subjected to frequency conversion into baseband signals in the transmission/reception sections 103. These baseband signals are subjected to reception processing such as FFT processing, error correction decoding and retransmission control in the baseband signal processing section 104. In this downlink data, downlink transmission data is transferred to the application section 105. The application section 105 performs processing related to higher layers above the physical layer and the MAC layer. In the downlink data, broadcast information is also transferred to the application section 105.

On the other hand, uplink transmission data is input from the application section 105 to the baseband signal processing section 104. In the baseband signal processing section 104, mapping processing, retransmission control (HARQ) transmission processing, channel coding, DFT (Discrete Fourier Transform) processing, IFFT processing and so on are performed. In the transmission/reception sections 103, the baseband signals output from the baseband signal processing section 104 are converted into a radio frequency band. After that, the frequency-converted radio frequency signals are amplified in the amplifying sections 102, and then, transmitted from the transmission/reception antennas 101. Each of the transmission/reception sections 103 serves as a reception section for receiving downlink control information, user data, reference signals (CRS, DM-RS, CSI-RS), information about a CSI-RS configuration and association information in which the CSI-RS configuration is associated with an information element contained in the downlink control information.

Figure 9:
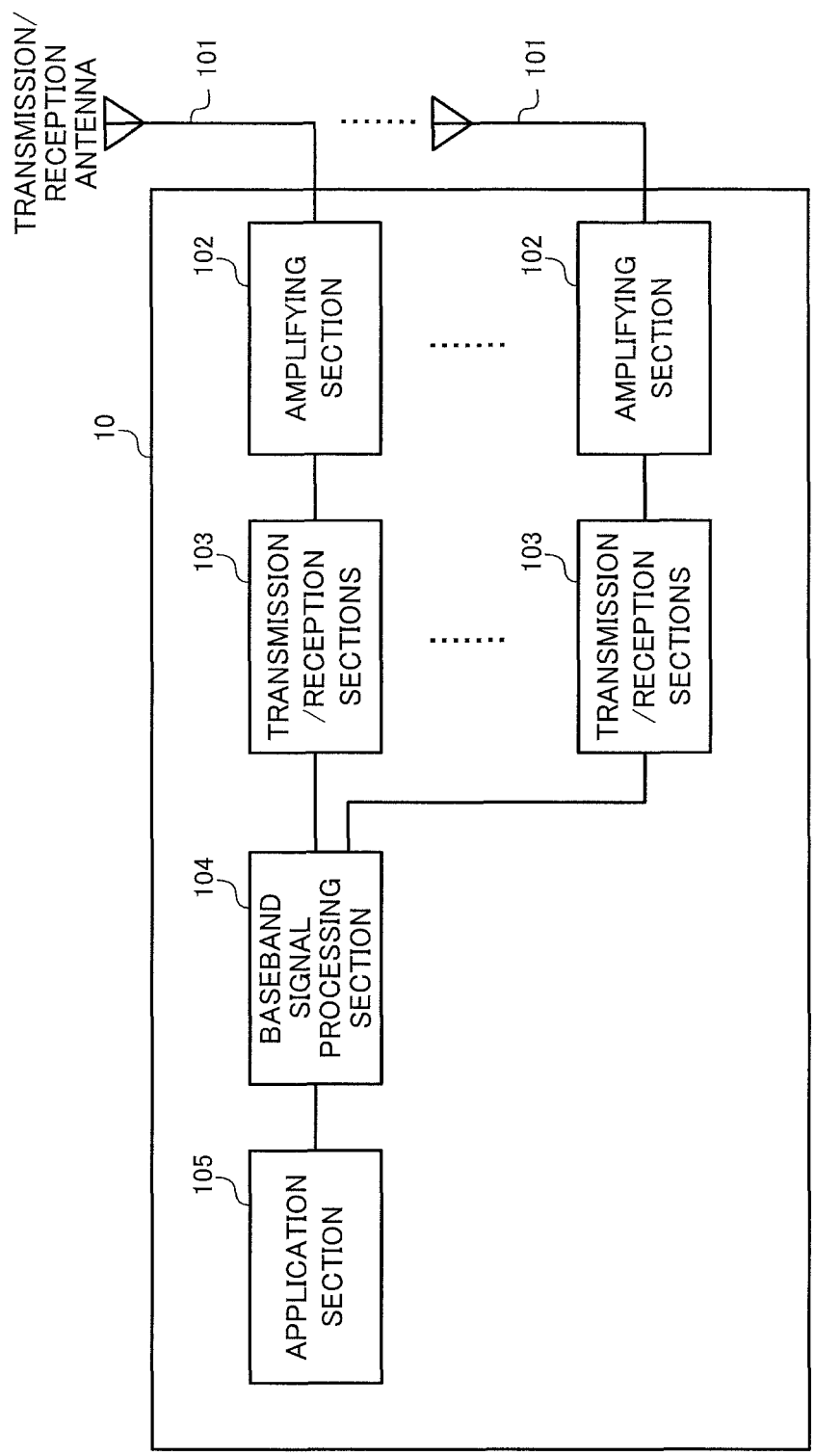
FIG. 9 is a diagram for explaining an overall configuration of a user terminal.
Figure 10:
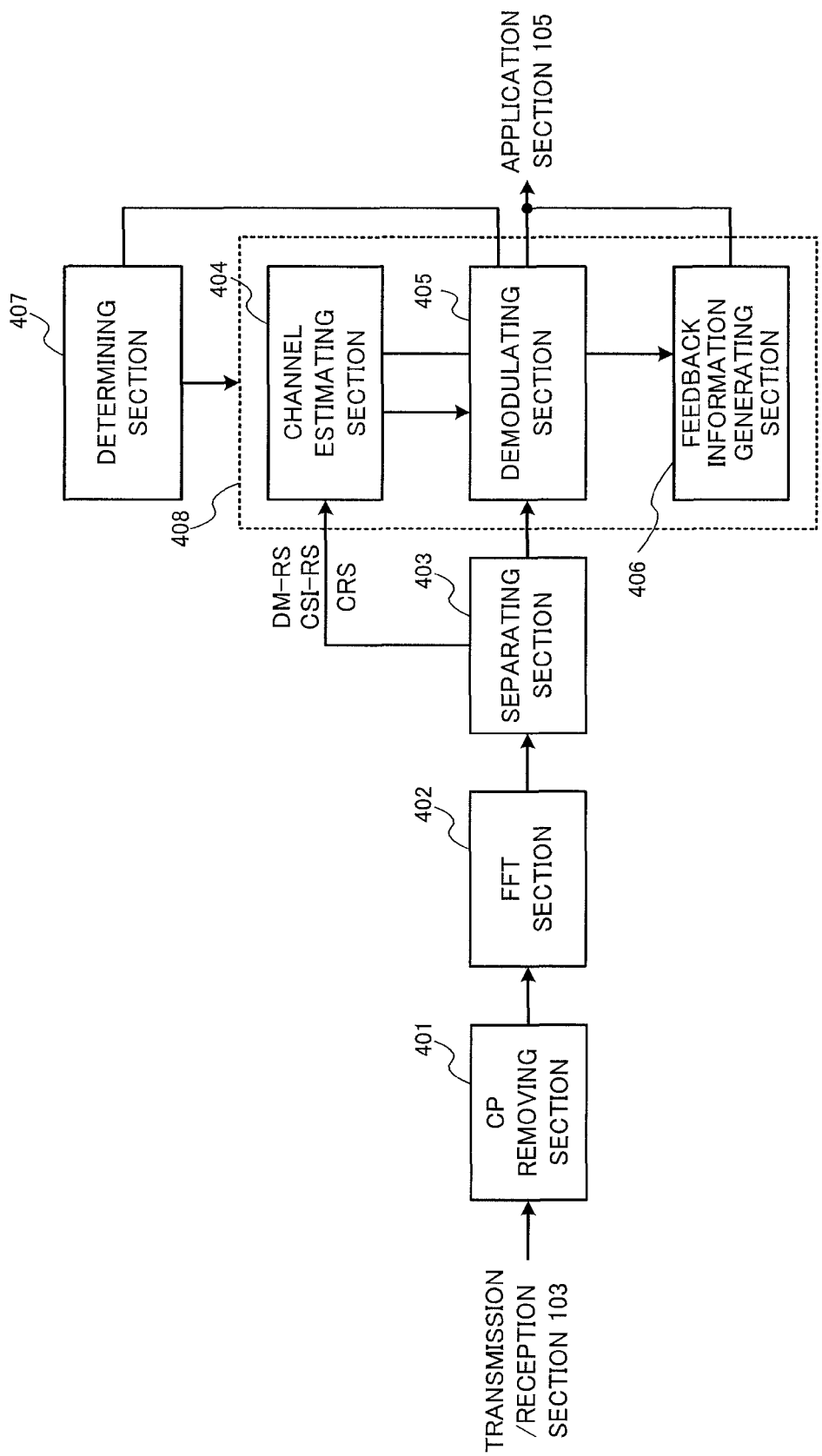
FIG. 10 is a functional block diagram of a baseband signal processing section of the user terminal.

FIG. 10 is a block diagram illustrating the structure of the baseband signal processing section of the user terminal illustrated in FIG. 9. The baseband signal processing section 104 is configured to mainly have a CP removing section 401, an FFT section 402, a separating section 403, a channel estimating section 404, a demodulating section 405, a feedback information generating section 406 and a determining section 407.

The CP removing section 401 removes the cyclic prefix (CP) from the reception signals. The FFT section 402 performs fast Fourier transform (FFT) on the CP-removed reception signals and converts them from the time domain signals to the frequency domain signals. The separating section 403 subcarrier-demaps the reception signals to separate reference signals (CRS, CSI-RS, DM-RS, etc.), downlink control information (DCI) and shared channel signals (user data). The reference signals (CRS, CSI-RS, DM-RS, etc.) are output to the channel estimating section 404.

The determining section 40 determines a channel state measurement reference signal associated with a received UE-specific reference signal based on association information of which the radio base station notifies the user terminal (information in which the CSI-RS configuration is associated with an information element contained in the downlink control information). That is, the determining section 407 determines a predetermined CSI-RS that is in quasi co-location with the received DM-RS.

For example, as illustrated in FIG. 5 mentioned above, it is assumed that "CSI-RS configuration 0" corresponds to "Scrambling identity 0" and "CSI-RS configuration 2" corresponds to "Scrambling identity 1". In this case, when the "Scrambling identity" in the downlink control information (DCI) demodulated in the demodulating section 405 is "0", the determining section 407 determines that the received DM-RS and the CSI-RS configuration 0 are in quasi co-location. On the other hand, when the "Scrambling identity" in the downlink control information (DCI) demodulated in the demodulating section 405 is "1", the determining section 407 determines that the received DM-RS and the CSI-RS configuration 2 are in quasi co-location. After that, the determining section 407 outputs the determining result to a signal processing section 408.

The signal processing section 408 performs the reception processing including channel measurement, synchronization processing, demodulation processing feedback information (CSI) generating processing and so on, based on the determination result output from the determining section 407. For example, in the determining section 407, when it is determined that the received DM-RS and the CSI-RS configuration 0 are in quasi co-location, the signal processing section 408 performs the reception processing on the assumption that the DM-RS and the CSI-RS are transmitted from the same transmission point. Specifically, as for the demodulation processing using the DM-RS, the signal processing section 408 is able to perform the reception processing using the reception timing of the CSI-RS that is in quasi co-location with the DM-RS and power delay profile.

The signal processing section 408 performs channel measurement, synchronization processing, demodulation processing, feedback information (CSI) generating processing and the like independently on each of downlink signals that are determined to be in quasi co-location.

The channel estimating section 404 outputs a channel estimation value obtained using the DM-RS, to the demodulating section 405 and also output a channel estimation value obtained using the CSI-RS, to the feedback information generating section 406. The demodulating section 405 is able to demodulate a shared channel signal using the channel estimation value.

The feedback information generating section 406 generates CSI (feedback information) using the obtained channel estimation value. CSI includes CSI per cell (PMI, CDI, CQI), inter-cell CSI (phase difference information, amplitude difference information), RI (Rank Indicator) and the like. These CSI signals are fed back to the radio base station via the PUCCH or PUSCH.

Thus, as the user terminal determines the CSI-RS that is in quasi co-location with the received DM-RS based on association information and performs reception processing, it is possible to improve the accuracy of the reception processing.

Up to this point, the present invention has been described in detail by way of the above-described embodiments. However, a person of ordinary skill in the art would understand that the present invention is not limited to the embodiments described in this description. The present invention could be embodied in various modified or altered forms without departing from the gist or scope of the present invention defined by the claims. Therefore, the statement in this description has been made for the illustrative purpose only and not to impose any restriction to the present invention.

The disclosure of Japanese Patent Application No. 2012-242896 filed on Nov. 2, 2012, including the specification, drawings, and abstract, is incorporated herein by reference in its entirety.

The invention claimed is:

1. A radio communication method for a plurality of radio base stations and a user terminal capable of communicating with the plurality of radio base stations, the radio communication method comprising the steps of:
by the radio base station,
transmitting downlink control information, a UE-specific reference signal and a channel state measurement reference signal to the user terminal;
transmitting information about configuration of the channel state measurement reference signal;
transmitting association information in which the configuration of the channel state measurement reference signal is associated with an information element contained in the downlink control in formation; and by the user terminal, determining the channel state measurement reference signal that is associated with the received UE-specific reference signal based on the association information; and performing reception processing, assuming that the UE-specific reference signal and the channel state measurement reference signal are transmitted from a same radio base stations wherein the radio base station instructs the user terminal to either determine or to not determine the channel state measurement reference signal associated with the received UE-specific reference signal based on the association information received by the user terminal.

2. The radio communication method according to claim 1, wherein the information element contained in the downlink control information is scrambling identity.

3. The radio communication method according to claim 1, wherein the radio base station notifies the user terminal of the association information by higher layer signaling or via a downlink control channel or an enhanced downlink control channel.

4. The radio communication method according to claim 1, wherein the radio base station applies, as a format of the downlink control information, DCI format 2B, DCI format 2C or a new DCI format.

5. The radio communication method according to claim 1, wherein, when receiving a channel state measurement reference signal of different configuration that is different from the configuration of the channel state measurement reference signal associated with the information element contained in the received downlink control information, the user terminal performs the reception processing on the channel state measurement reference signal of different configuration, assuming that the channel state measurement reference signal and the received UE-specific reference signal are transmitted from different radio base stations.

6. The radio communication method according to claim 1, wherein, when the configuration of the channel state measurement reference signal and/or a physical cell ID or virtual cell ID to use in generation of the UE-specific reference signal is reconfigured, the user terminal stops use of the association information.

7. A radio communication system comprising:
a plurality of radio base stations; and
a user terminal capable of communicating with the plurality of radio base stations, the radio base station comprising:
a generating section that generates downlink control information, a UE-specific reference signal and a channel state measurement reference signal; and
a transmitting section that transmits, to the user terminal, the downlink control information, the UE-specific reference signal, the channel state measurement reference signal, information about configuration of the channel state measurement reference signal; and association information in which the configuration of the channel state measurement reference signal is associated with an information element contained in the downlink control information, and
the user terminal comprising:
a determining section that determines the channel state measurement reference signal that is associated with the received UE-specific reference signal based on the association information; and
a signal processing section that performs reception processing, assuming that the UE-specific reference signal and the channel state measurement reference signal are transmitted from a same radio base stations,
wherein the radio base station instructs the user terminal to either determine or to not determine the channel state measurement reference signal associated with the received UE-specific reference signal based on the association information received.

8. A radio base station in a radio communication system having a plurality of radio base stations and a user terminal capable of communicating with the plurality of radio base stations, the radio base station comprising:
a generating section that generates downlink control information, a LE-specific reference signal and a channel state measurement reference signal; and
a transmitting section that transmits, to the user terminal, the downlink control information, the UE-specific reference signal, the channel state measurement reference signal, information about configuration of the channel state measurement reference signal, and association information in which the configuration of the channel state measurement reference signal is associated with an information element contained in the downlink control information,
wherein the radio base station instructs the user terminal to either determine or to not determine the channel state measurement reference signal associated with the received UE-specific reference signal based on the association information received by the user terminal.

9. A user terminal that is configured to be capable of communications with a plurality of radio base stations, the user terminal comprising:
a receiving section that receives, from the radio base station, downlink control information, a UE-specific reference signal, a channel state measurement reference signal, information about configuration of the channel state measurement reference signal, and association information in which the configuration of the channel state measurement reference signal is associated with an information element contained in the downlink control information;
a determining section that determines the channel state measurement reference signal that is associated with the received UE-specific reference signal based on the association information; and
a signal processing section that performs reception processing, assuming that the UE-specific reference signal and the channel state measurement reference signal are transmitted from a same radio base station,
wherein the radio base station instructs the user terminal to either determine or to not determine the channel state measurement reference signal associated with the received UE-specific reference signal based on the association information received by the user terminal.

10. The radio communication method according to claim 2, wherein the radio base station notifies the user terminal of the association information by higher layer signaling or via a downlink control channel or an enhanced downlink control channel.

* * * * *